United States Patent
Agnoletto et al.

(10) Patent No.: US 8,550,481 B2
(45) Date of Patent: Oct. 8, 2013

(54) MOTOR VEHICLE WITH REAR SHOCK ABSORBER HAVING A DIFFERENTIATED EFFECT FOR CONTROLLING VEHICLE ATTITUDE DURING BRAKING, AND CONTROL METHOD USED THEREIN

(71) Applicant: Fiat Group Automobiles S.p.A., Turin (IT)

(72) Inventors: Emiliano Agnoletto, Turin (IT); Valerio Castelli, Turin (IT)

(73) Assignee: Fiat Group Automobiles S.p.A., Turin (IT)

( * ) Notice: Subject to any disclaimer, the term of this patent is extended or adjusted under 35 U.S.C. 154(b) by 0 days.

(21) Appl. No.: 13/711,090

(22) Filed: Dec. 11, 2012

(65) Prior Publication Data

US 2013/0154223 A1 Jun. 20, 2013

(30) Foreign Application Priority Data

Dec. 19, 2011 (EP) .................................... 11194313

(51) Int. Cl.
*B60G 17/016* (2006.01)

(52) U.S. Cl.
USPC ................................ 280/124.104; 280/5.513

(58) Field of Classification Search
USPC .......................... 280/124.104, 5.513, 124.105
See application file for complete search history.

(56) References Cited

U.S. PATENT DOCUMENTS

| 3,537,715 | A | * | 11/1970 | Gualdoni ............... 280/124.104 |
| 6,776,269 | B1 | | 8/2004 | Schel |
| RE40,649 | E | | 3/2009 | Farr et al. |
| 2003/0047397 | A1 | | 3/2003 | Farr et al. |
| 2004/0094376 | A1 | | 5/2004 | Van Wonderen |

FOREIGN PATENT DOCUMENTS

| EP | 1 293 702 | 3/2003 |
| GB | 1 238 508 | 7/1971 |

OTHER PUBLICATIONS

Search Report for EP 11194313.0 dated Apr. 26, 2012.

* cited by examiner

*Primary Examiner* — Joseph Rocca
*Assistant Examiner* — Laura Freedman
(74) *Attorney, Agent, or Firm* — Nixon & Vanderhye, P.C.

(57) ABSTRACT

A motor vehicle includes a rear suspension equipped with at least one shock absorber including a by-pass passage for bringing about a damping effect that is different in different portions of the stroke of the plunger of the shock absorber. The shock absorber and the by-pass passage are configured in such a way that the shock absorber produces a maximum damping effect in a final stretch of the stroke of the plunger in the direction of lengthening of the shock absorber, said final stretch of stroke being pre-arranged so as to correspond to the final part of the maximum possible lift of said rear suspension during braking of the motor vehicle.

4 Claims, 5 Drawing Sheets

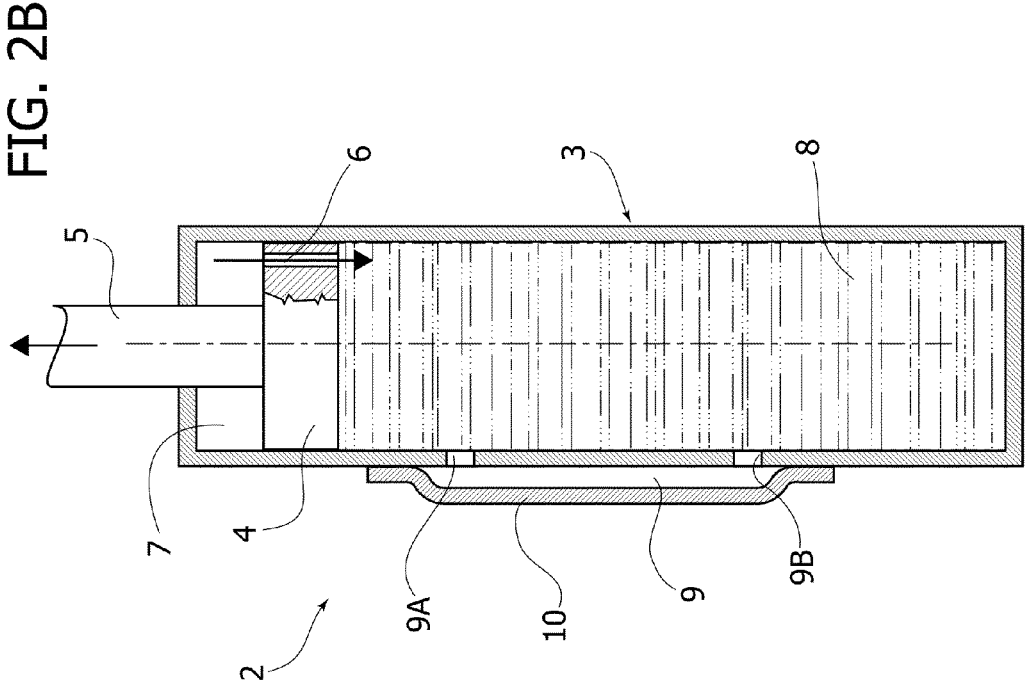
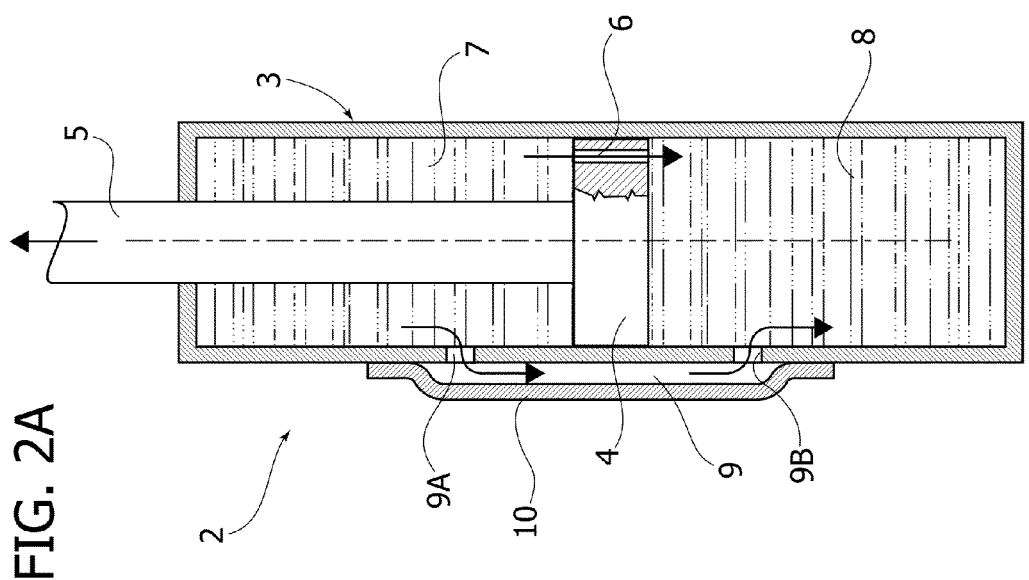

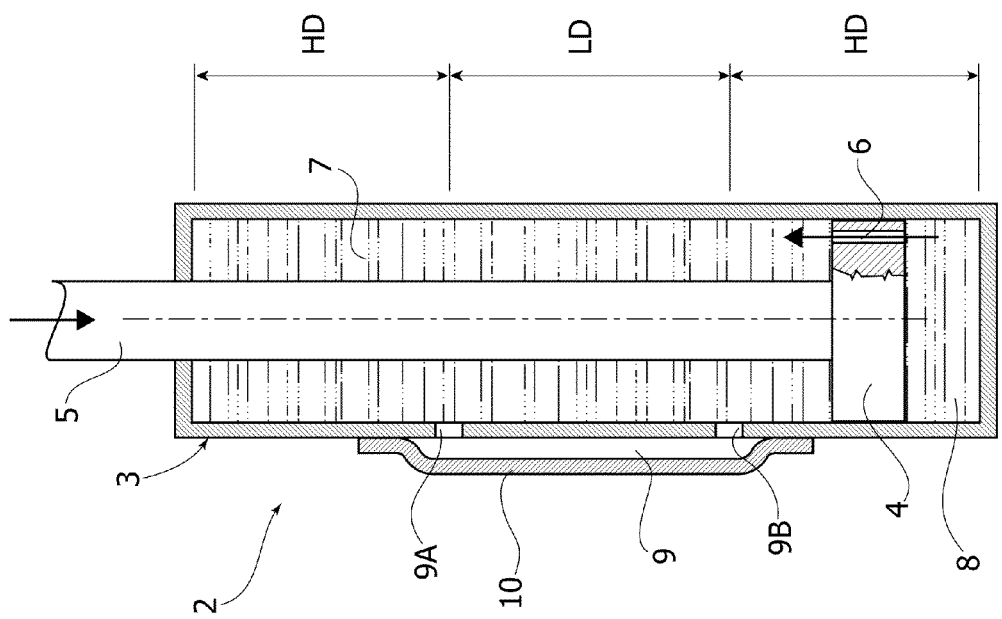

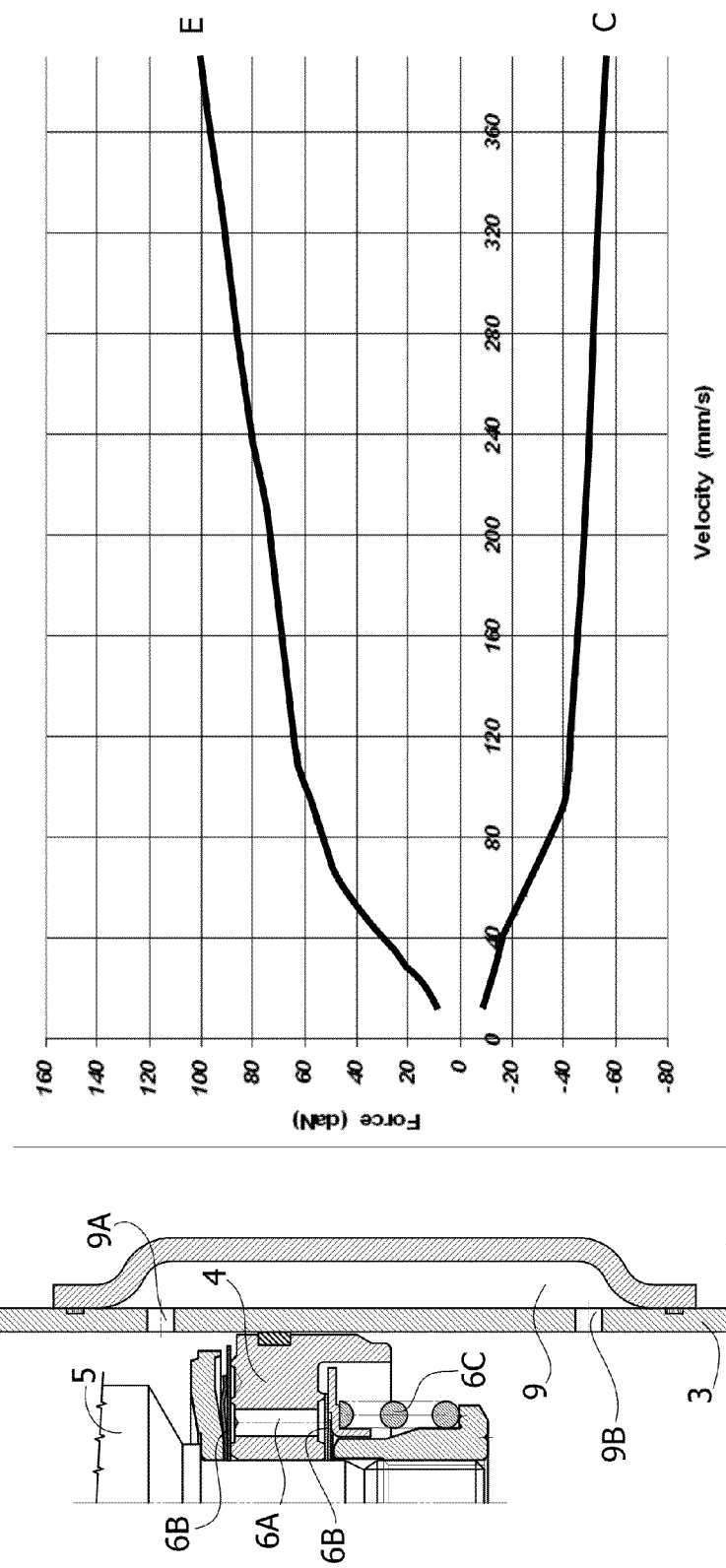

MOTOR VEHICLE WITH REAR SHOCK ABSORBER HAVING A DIFFERENTIATED EFFECT FOR CONTROLLING VEHICLE ATTITUDE DURING BRAKING, AND CONTROL METHOD USED THEREIN

This application claims priority to EP 11194313.0 filed 19 Dec. 2011, the entire contents of which is hereby incorporated by reference.

FIELD OF THE INVENTION

The present invention relates to a motor vehicle with a rear suspension including at least one hydraulic shock absorber, said shock absorber including: a cylindrical body; a plunger slidably mounted in the cylindrical body; a stem connected to the plunger and coming out of one end of the cylindrical body; valve means associated to said plunger for setting the two chambers present inside the cylindrical body and located on the two opposite sides of the plunger in communication with one another; and a by-pass passage on the outside of said cylindrical body, which has two opposite ends giving out into two openings of the wall of the cylindrical body axially set at a distance from one another, in such a way that said shock absorber produces a damping effect that is different in different portions of the stroke of the plunger.

Shock absorbers of the type referred to above are known and used, for example, in relatively heavy vehicles, such as commercial vehicles, which have large variations in weight on the rear axle, in order to obtain two different damping effects according to the attitude of the motor vehicle so as to obtain a greater comfort with the vehicle empty and a reduction of body motions with the vehicle at full load. Typically, in said known solutions, the maximum damping effect is provided in the final stretch of the stroke of the plunger in the direction of shortening of the shock absorber, whereas throughout the remaining part of the stroke of the plunger, in one direction or the other, the damping effect is less.

OBJECT OF THE INVENTION

The object of the present invention is to provide a motor vehicle with a rear suspension equipped with hydraulic shock absorbers of the type referred to above that will enable further advantages to be obtained from the standpoint of safety and stability of driving, in any travelling condition.

SUMMARY OF THE INVENTION

The main characteristic of the invention lies in that the aforesaid shock absorber and the aforesaid by-pass passage are configured in such a way that the shock absorber produces a maximum damping effect in a final stretch of the stroke of the plunger in the direction of lengthening of the shock absorber, said final stretch of stroke being pre-arranged so as to correspond to the final part of the maximum possible lift of said rear suspension during braking of the motor vehicle.

Thanks to the aforesaid characteristics, the invention enables reduction of lifting of the rear part of the vehicle induced by the transfer of the loads during braking. The reduction of lifting of the rear suspension entails a smaller decrease of the load on the rear wheels, with consequent greater braking efficiency. There derives therefrom a reduction of the braking space, and an elimination of the unbalancing of the motor vehicle due to movements of pitch induced by braking, this being a particularly important drawback in conventional motor vehicles with short wheel base and high centre of gravity.

The invention enables the aforesaid advantageous effects to be achieved without jeopardizing vibrational comfort in normal travelling conditions.

According to a further preferred characteristic, it is envisaged that said shock absorber and said by-pass pipe are configured in such a way as to give rise to the maximum damping effect also in a final stretch of the stroke of the plunger in the direction of shortening of the shock absorber in order to improve the travelling comfort and the stability of the vehicle even in extreme conditions, such as, for example, with the vehicle at full load travelling over a hump or other irregular road profile that will cause a sudden maximum compression of the shock absorber.

The subject of the invention is also a control method according to claim 1.

BRIEF DESCRIPTION OF THE FIGURES

Further characteristics and advantages of the invention will emerge from the ensuing description with reference to the annexed drawings, which are provided purely by way of non-limiting example and in which:

FIG. 2 is a schematic illustration of an example of embodiment of a hydraulic shock absorber according to the invention during an intermediate step (A) and a final step (B) of the stroke of the plunger in the direction of lengthening of the shock absorber;

FIG. 3 shows a view corresponding to those of FIG. 2, in which the plunger is in a final stretch of its stroke in the direction of shortening of the shock absorber;

FIGS. 4A and 5A are detailed cross-sectional views of an embodiment of the shock absorber according to the invention, illustrated in the step of FIG. 2A and in the step of FIG. 2B, respectively; and FIGS. 4B and 5B show diagrams illustrating the different damping effect in the direction of lengthening and in the direction of shortening, in the step of operation illustrated in FIG. 4A and in the step of operation illustrated in FIG. 5A, respectively.

DETAILED DESCRIPTION OF THE INVENTION

Figure 1A:
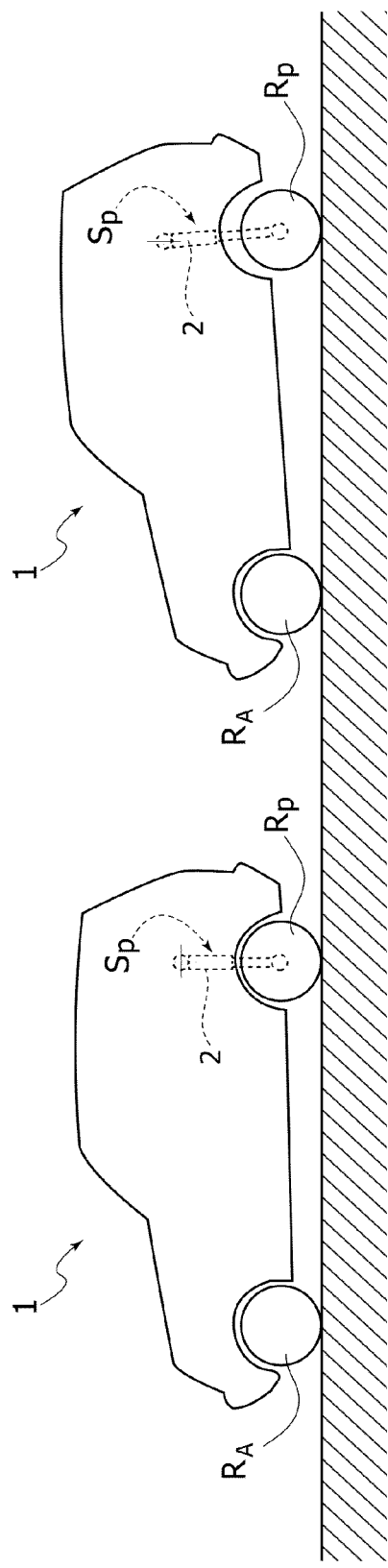
FIG. 1 shows in a schematic side view a motor vehicle in normal travelling attitude (A) and during braking (B)

FIG. 1A shows a motor vehicle 1 with front wheels $R_A$ and rear wheels $R_P$, during a normal travelling condition. Associated to the rear wheels $R_P$ is a rear suspension $S_P$, including a pair of hydraulic shock absorbers 2 (just one of which is schematically illustrated).

Figure 1B:
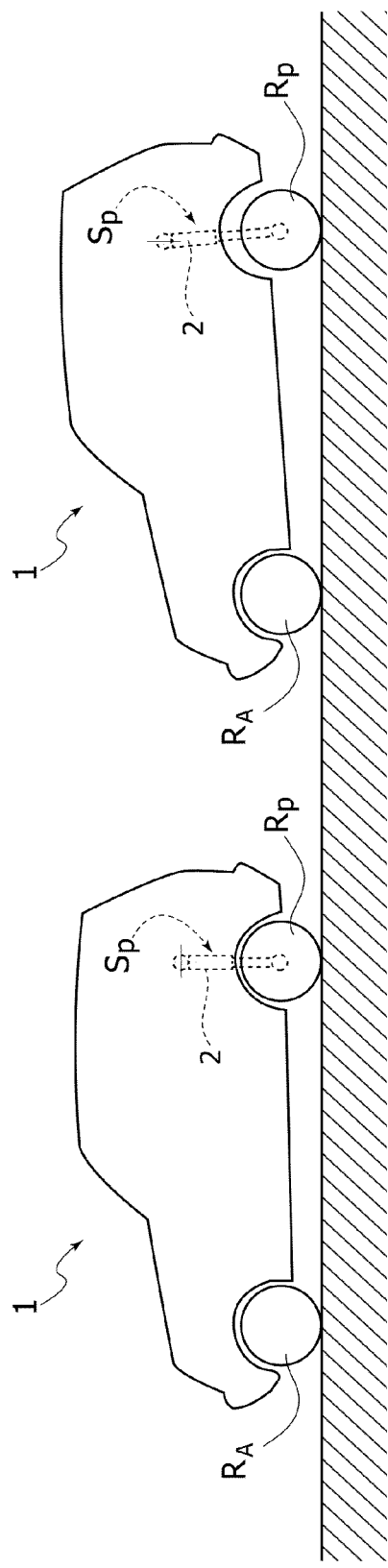

FIG. 1B shows the same motor vehicle 1 during braking, the effect of which is to produce lifting of the rear part of the motor vehicle, with consequent lengthening of the shock absorbers 2.

FIGS. 2 and 3 illustrate an example of embodiment of the shock absorber used in the motor vehicle according to the invention, in three different operating steps. In said drawings, for simplicity, it is assumed that the plunger of the shock absorber has a single passage for communication of the two chambers of the shock absorber with one another, without control valves, as is instead common practice. The elimination of said constructional details, in themselves of a known type, from the drawings renders the latter faster and easier to understand.

With reference to FIGS. 1-3, the reference number 3 designates as a whole the cylindrical body, slidably mounted within which is the plunger 4, to which the stem 5 coming out of the body 3 is connected. The plunger 4 is illustrated, as mentioned above, in a simplified way, with a single passage 6 that sets the chamber 7, containing the stem 5, which in the drawings is illustrated above the plunger 4, in communication with the chamber 8, situated on the opposite side of the plunger.

The overall structure of the shock absorber is illustrated in FIGS. 2 and 3 in a simplified way. In the concrete embodiments, there can of course be provided, for example, in accordance with the traditional technique, a further cylindrical body external to the body 3 and coaxial therewith in order to define on the outside of the body 3 a chamber that can be used as oil tank.

As may be seen in FIGS. 2 and 3, moreover provided on the outside of the cylindrical body 3 is a by-pass pipe 9, defined between the wall of the cylindrical body 3 and a wall 10 that surrounds it coaxially. The by-pass pipe 9 is designed to set the two chambers 7, 8 of the shock absorber in communication with one another when the plunger 4 is in an axially intermediate position between the opposite ends of the by-pass pipe 9, which give out at the openings 9A, 9B of the wall defining the cylindrical body 3, in positions axially set at a distance from one another.

FIG. 2A shows the shock absorber in a step in which the plunger 4 is moving in the direction E of lengthening of the shock absorber and is in a position axially intermediate between the openings 9A and 9B. In said condition, lifting (with reference to FIG. 2A) of the plunger 4 causes transfer of the oil contained in the chamber 7 to the chamber 8, it being possible for said transfer to take place both through the passage 6 provided in the plunger 4 and through the by-pass pipe 9. In said step, the shock absorber consequently produces its least damping effect.

FIG. 2B illustrates the plunger in the final step of its stroke in the direction E of lengthening of the shock absorber. In said step, which starts from the moment when the plunger 3 covers the opening 9A, the shock absorber produces its greatest damping effect in so far as the oil present in the chamber 7 can transfer into the chamber 8 passing only through the passage 6 associated to the plunger 4.

With reference once again to FIG. 1, the shock absorber of FIGS. 1-3 is consequently configured in such a way as to cause the final stretch of stroke of the plunger 4 that produces a greater damping effect to correspond to the final stretch of the stroke of maximum lift to which the rear part of the motor vehicle is subjected during braking (FIG. 1B). In this way, the motor vehicle can be configured to undergo a reduced lifting from its rear axle during braking, with consequent advantages in terms of reduction in the decrease of load on the rear wheels during braking and reduction of the braking space and of the movements of pitch induced by braking. On the other hand, said result does not jeopardize the optimal characteristics of vibrational comfort during normal travelling conditions thanks to the fact that in said conditions the shock absorbers of the rear suspension produce their least damping effect.

According to a preferred characteristic, proper to the embodiment illustrated in FIGS. 2 and 3, the by-pass pipe is pre-arranged so as to generate the greatest damping effect also in a final stretch of the stroke of the plunger in the direction of shortening of the shock absorber. Said effect may be seen in FIG. 3, which shows the plunger 4 in said step, during the movement of shortening (arrow C in FIG. 3) of the shock absorber. Thanks to said additional characteristic, the rear suspension of the motor vehicle guarantees excellent comfort and stability of the vehicle even in extreme conditions, such as, for example, with the vehicle at full load on rough terrain or over humps in the road, which entails sudden compression of the shock absorber as far as its configuration of minimum length. In FIG. 3, designated by LD is the central stretch with low damping effect of the stroke of the plunger, and designated by HD are the two end stretches, with high damping effect, of the stroke of the plunger.

Figures 4A, 4B:
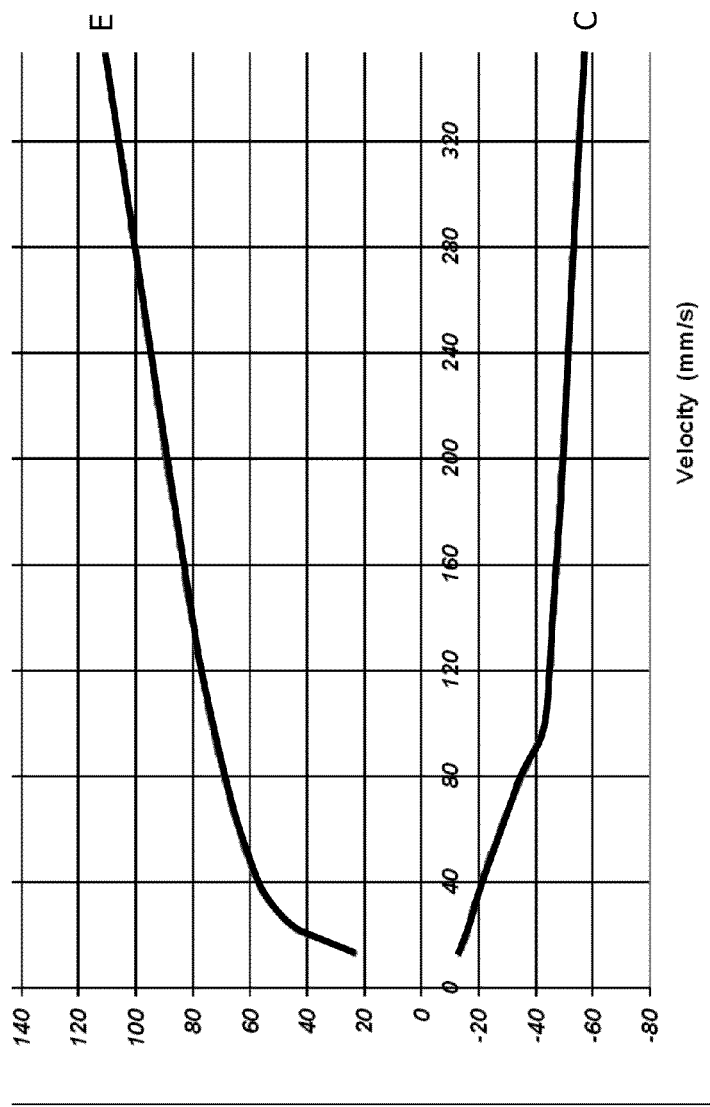

FIGS. 4A and 5A show a concrete embodiment of the shock absorber of FIGS. 2-3 with reference to the detail of the plunger 4 and of the by-pass pipe 9. Illustrated in this case is a passage 6A obtained through the plunger 4 that is designed for passage of oil during the displacements of the plunger in the direction of lengthening E of the shock absorber (i.e., upwards as viewed in the figure). The opposite ends of the passage 6A giving out into the two opposite faces of the plunger 4 are controlled by valve means including leaf elements open/close 6B and, on one side of the plunger, by a helical spring 6C.

FIG. 5A regards the step in which the plunger is in an intermediate position between the openings 9A, 9B so that the oil can pass from the chamber 7 to the chamber 8 passing both through the passage 6A and through the by-pass pipe 9. FIG. 4A shows the condition corresponding to FIG. 2B, i.e., to the final stretch of the stroke of the plunger in the direction of lengthening E. In said step, the plunger has already passed beyond the opening 9A, and the passage of oil can take place only through the passage 6A of the plunger 4, with a consequent greater damping effect.

FIG. 5B shows the force-speed diagrams in the step in which the plunger is in an intermediate position between the openings 9A, 9B (FIG. 4A), with reference to a movement in the direction of lengthening (E) and to a movement in the direction of shortening (C), respectively.

FIG. 4B shows the same diagrams with reference to a step in which the plunger 4 is above the opening 9A (as viewed in FIG. 5A), in the case of movement in the direction of lengthening (E) and in the direction of shortening (C), respectively.

As is evident from a comparison of the diagrams of FIGS. 4B and 5B, a differentiated damping effect is obtained during the movement of the plunger in the direction of lengthening (E), with a smaller effect in the stretch of stroke in which the plunger is in an intermediate axial position between the openings 9A, 9B (so that the by-pass pipe is active) and a greater effect in the stretch in which the plunger 4 is set beyond the opening 9A (so that the by-pass pipe 9 is not used).

As is evident from the foregoing description, the invention enables exploitation of a shock absorber with differentiated damping effect for improving the safety and stability of driving of the motor vehicle, in particular during braking, without consequently jeopardizing the necessary characteristics of comfort during normal travelling conditions.

Of course, without prejudice to the principle of the invention, the details of construction and the embodiments may vary widely with respect to what has been described and illustrated herein purely by way of example, without thereby departing from the scope of the present invention.

What is claimed is:

1. A motor vehicle with a rear suspension including at least one hydraulic shock absorber, said shock absorber comprising: a cylindrical body; a plunger slidably mounted in the cylindrical body; a stem connected to the plunger and coming out of one end of the cylindrical body; valve means associated to said plunger for setting in communication with one another the two chambers present inside the cylindrical body and located on the two opposite sides of the plunger; and a by-pass passage on the outside of said cylindrical body, having two opposite ends giving out into two openings of the wall of the cylindrical body axially set at a distance from one another, in such a way that said shock absorber produces a damping effect that is different in different portions of a stroke of the plunger, wherein said shock absorber and said by-pass passage are configured in such a way that said shock absorber produces a maximum damping effect in a final stretch of the stroke of the plunger in the direction of lengthening of the shock absorber, wherein said shock absorber and said by-pass passage are configured so that said final stretch of stroke is pre-arranged so as to correspond to a final part of a maximum possible lift of said rear suspension during braking of the motor vehicle, which enables a reduction of lifting of a rear part of the vehicle induced by a transfer of loads of the vehicle during braking.

2. The motor vehicle according to claim 1, wherein said shock absorber and said by-pass passage are moreover configured in such a way that said shock absorber produces a maximum damping effect also in a final stretch of the stroke of the plunger in the direction of shortening of the shock absorber.

3. A method for controlling the attitude of a motor vehicle during braking, provided in which is a rear suspension including at least one hydraulic shock absorber, said shock absorber comprising: a cylindrical body; a plunger slidably mounted in the cylindrical body; a stem connected to the plunger and coming out of one end of the cylindrical body; valve means associated to said plunger for setting in communication with one another the two chambers present inside the cylindrical body and located on the two opposite sides of the plunger; and a by-pass passage on the outside of said cylindrical body having two opposite ends giving out into two openings of the wall of the cylindrical body axially set at a distance from one another, in such a way that said shock absorber produces a damping effect that is different in different portions of the stroke of the plunger, wherein said shock absorber and said by-pass passage are configured in such a way that said shock absorber produces a maximum damping effect in a final stretch of the stroke of the plunger in the direction of lengthening of the shock absorber, wherein said shock absorber and said by-pass passage are configured in such a way that said final stretch of stroke is pre-arranged so as to correspond to a final part of the maximum possible lift of said rear suspension during braking of the motor vehicle, so that a reduction is obtained of the lifting of a rear part of the vehicle induced by a transfer of loads of the vehicle during braking.

4. The control method according to claim 3, wherein said shock absorber and said by-pass passage are moreover configured in such a way that said shock absorber produces a maximum damping effect also in a final stretch of the stroke of the plunger in the direction of shortening of the shock absorber.

* * * * *